US012076839B2

(12) United States Patent
Chen

(10) Patent No.: US 12,076,839 B2
(45) Date of Patent: Sep. 3, 2024

(54) POWER RATCHET

(71) Applicant: JS Products, Inc., Las Vegas, NV (US)

(72) Inventor: Chungeng Chen, Las Vegas, NV (US)

(73) Assignee: JS Products, Inc., Las Vegas, NV (US)

( * ) Notice: Subject to any disclaimer, the term of this patent is extended or adjusted under 35 U.S.C. 154(b) by 964 days.

(21) Appl. No.: 16/726,595

(22) Filed: Dec. 24, 2019

(65) Prior Publication Data

US 2020/0198099 A1 Jun. 25, 2020

Related U.S. Application Data

(60) Provisional application No. 62/784,622, filed on Dec. 24, 2018.

(51) Int. Cl.
*B25B 21/00* (2006.01)
*B25B 13/46* (2006.01)

(52) U.S. Cl.
CPC ............ *B25B 21/004* (2013.01); *B25B 13/46* (2013.01)

(58) Field of Classification Search
CPC ........ B25B 21/00; B25B 21/02; B25B 21/004
See application file for complete search history.

(56) References Cited

U.S. PATENT DOCUMENTS

| | | | | | |
|---|---|---|---|---|---|
| 2,711,111 | A * | 6/1955 | James | B25B 21/004 | 81/58.2 |
| 3,529,498 | A * | 9/1970 | Northcutt | B25B 21/004 | 81/57.13 |
| 4,346,630 | A * | 8/1982 | Hanson | B25B 21/004 | 81/57.13 |
| 4,766,784 | A * | 8/1988 | Lai | B25B 13/465 | 81/465 |
| 4,821,611 | A * | 4/1989 | Izumisawa | B25B 21/004 | 173/93.6 |
| 4,919,022 | A * | 4/1990 | Ono | B25B 21/004 | 173/93.5 |
| 5,022,289 | A * | 6/1991 | Butzen | B25B 13/465 | 81/57.13 |
| RE33,711 | E * | 10/1991 | Ono | B25B 21/004 | 81/464 |
| 5,142,952 | A * | 9/1992 | Putney | B25B 13/465 | 81/57 |
| 5,237,885 | A * | 8/1993 | Putney | B25B 13/465 | 74/116 |

(Continued)

FOREIGN PATENT DOCUMENTS

CN 207983223 U 10/2018

*Primary Examiner* — David B. Thomas
(74) *Attorney, Agent, or Firm* — Weide & Miller, Ltd.

(57) ABSTRACT

A power ratchet includes a ratchet body and a handle portion connected to the ratchet body. A ratchet assembly is disposed within a cavity of the ratchet body. The ratchet assembly includes a drive member, a pawl, and a ring gear. The ring gear is rotatable within the cavity and includes inner teeth that interface with the pawl. The ring gear has a flange with an interfacing surface and a cam follower. A drive assembly of the power ratchet has a motor and a drive shaft. The drive shaft includes a cam. The cam interfaces with the cam follower when the motor unit rotates the drive shaft to rotate the drive member via the pawl and the inner teeth. The interfacing surface of the flange interfaces with a stop surface formed in the cavity to transfer a torque applied to the handle portion to the drive member.

17 Claims, 7 Drawing Sheets

(56) References Cited

U.S. PATENT DOCUMENTS

| | | | | | |
|---|---|---|---|---|---|
| 5,896,789 | A * | 4/1999 | Giardino | B25B 21/004 81/57.39 |
| 5,967,002 | A * | 10/1999 | Pijanowski | B25B 13/463 81/438 |
| 6,305,246 | B1 * | 10/2001 | Horvath | B25B 13/461 81/57.39 |
| 6,923,095 | B2 * | 8/2005 | Horvath | B25B 21/004 81/57 |
| 7,059,217 | B2 * | 6/2006 | Horvath | B25B 21/004 81/57 |
| 7,080,578 | B2 * | 7/2006 | Izumisawa | B25B 21/004 173/168 |
| 7,171,873 | B2 * | 2/2007 | Horvath | B25B 21/004 81/57 |
| 7,458,295 | B1 * | 12/2008 | Lu | B25B 13/463 81/57.14 |
| 8,261,849 | B2 * | 9/2012 | Kobayashi | B25B 13/465 173/109 |
| 9,120,213 | B2 * | 9/2015 | Eiger | B25B 21/004 |
| 9,289,885 | B2 * | 3/2016 | Kobayashi | B25B 21/005 |
| 10,549,410 | B2 * | 2/2020 | Hu | H02K 7/145 |
| 2002/0184975 | A1 | 12/2002 | Ono et al. | |

* cited by examiner

POWER RATCHET

CROSS-REFERENCE TO RELATED APPLICATION

This application claims priority to U.S. Provisional Application No. 62/784,622, which was filed on Dec. 24, 2018, the contents of which are hereby incorporated by reference.

BACKGROUND

Many contractors, hobbyists, and do-it-yourselfers maintain and use ratcheting tools. Such tools might include ratcheting socket sets, ratcheting wrenches, or the like. These tools allow the user to maintain a connection with a nut, bolt, screw, or other fastener while tightening or loosening the fastener with an oscillating motion.

One drawback of such tools is that when the fastener is loose, it is sometimes difficult for the ratcheting tool to work because the small resistance provided by the loose fastener is insufficient to force a pawl to slide over the sloped edges of the teeth of rack. This may force the user to disengage and reengage the tool from the fastener despite the presence of the ratchet on the tool, or to use a separate tool, to rotate the fastener until it is removed or until the fastener reaches a point where it provides sufficient resistance for the ratcheting tool to work properly.

SUMMARY

In view of the above, a power ratchet has been developed that may quickly drive a fastener such as a nut or bolt even when the nut or bolt sits loosely on a part to which it is assembled. According to an exemplary embodiment, a power ratchet may include a ratchet body having a ratchet head disposed at a first end and a shoulder portion disposed at a second end. The power ratchet may further include a handle portion including a tube connected to the shoulder portion of the ratchet body. An end cap may be connected to the tube opposite the shoulder portion.

The power ratchet may also include a ratchet assembly disposed within a cavity of the ratchet head. The ratchet assembly may include a drive member, a rotatable pawl connected to and disposed at least partially within the drive member, a switch knob attached to and configured to rotate the rotatable pawl, and a ring gear surrounding the drive member. The ring gear may be rotatable within the cavity of the ratchet head and may include inner teeth that interface with the pawl. The ring gear may also include two flanges that each have an outer interfacing surface and an inner cam follower surface.

A drive assembly may be disposed within the ratchet body and the handle portion. The drive assembly may include a motor unit and a drive shaft connected to the motor unit. The drive shaft may include a reinforced end and a spherical cam disposed on the reinforced end of the driveshaft. Where the drive shaft defines a first axis, the spherical cam is attached to the drive shaft so as to be offset from the first axis.

In such an embodiment, the spherical cam interfaces with the inner cam follower surface of each flange to oscillate the ring gear when the motor unit rotates the drive shaft. The oscillation rotates the drive member of the ratchet assembly via the pawl and the inner teeth of the ring gear. This rotation may quickly drive a fastener, especially in a loose condition. Further, the outer interfacing surface of one of the two flanges interfaces with a stop surface formed in the cavity of the ratchet head to transfer a torque applied to the handle portion to the drive member of the ratchet assembly. Thus, the power ratchet may work as a conventional ratchet to apply a large torque to fastener.

In some embodiments, the power ratchet may further have a power source connected to the motor unit. The power source may be a battery holder configured to house at least one battery. The end cap may provide access to the battery holder.

The motor unit may connect to the drive shaft via a gear box. The drive shaft may be supported by one or more bearings. A resilient cover may be disposed over the handle portion.

In another exemplary embodiment, a power ratchet includes a ratchet body having a ratchet head disposed at a first end thereof, a handle portion connected to the second end of the ratchet body, and a ratchet assembly disposed within a cavity of the ratchet head. The ratchet assembly includes a drive member, a pawl connected to the drive member, and a ring gear surrounding the drive member. The ring gear may be rotatable within the cavity of the ratchet head. The ring gear includes inner teeth that interface with the pawl and at least one flange comprising an interfacing surface and a cam follower surface.

A drive assembly may be disposed within the ratchet body and the handle portion. The drive assembly includes a motor unit and a drive shaft connected to the motor unit. The drive shaft comprises a cam disposed on the end of the driveshaft. The cam interfaces with the cam follower surface of the flange of the ring gear when the motor unit rotates the drive shaft to rotate the drive member via the pawl and the inner teeth. The interfacing surface of the flange interfaces with a stop surface formed in the cavity of the ratchet head to transfer a torque applied to the handle portion to the drive member of the ratchet assembly.

In some embodiments, the at least on flange includes two flanges, and the cam of the driveshaft interfaces with the two flanges to oscillate the ring gear.

The pawl may be rotatable and include a first set of teeth on a first side and a second set of teeth on a second side. The first set of teeth are configured to interface with the inner teeth of the ring gear to catch in a first rotational direction and slip over the inner teeth of the ring gear in a second rotational direction. Similarly, the second set of teeth are configured to interface with the inner teeth of the ring gear to catch in the second rotational direction and slip over the inner teeth of the ring gear in the first rotational direction.

The ratchet assembly may include a switch knob connected to the pawl to selectively rotate either the first set of teeth or the second set of teeth into engagement with the inner teeth of the ring gear. The drive assembly rotates the drive member of the ratchet assembly in the first or second rotational direction based on the engagement of the first or second set of teeth with the inner teeth of the ring gear.

The power ratchet of claim 8, further comprising a power source connected to the motor unit.

In some embodiments, the power ratchet may further have a power source connected to the motor unit. The power source may be a battery holder configured to house at least one battery. The end cap may provide access to the battery holder.

The motor unit may connect to the drive shaft via a gear box. The drive shaft may be supported by one or more bearings. A resilient cover may be disposed over the handle portion.

In another exemplary embodiment, a method of tightening a fastener is provided. The method includes providing a power ratchet including a ratchet body having a ratchet head disposed at a first end thereof, a handle portion connected to the second end of the ratchet body, and a ratchet assembly disposed within a cavity of the ratchet head. The ratchet assembly includes a drive member, a pawl connected to the drive member, and a ring gear surrounding the drive member. The ring gear may be rotatable within the cavity of the ratchet head. The ring gear includes inner teeth that interface with the pawl and at least one flange including an interfacing surface and a cam follower surface.

A drive assembly may be disposed within the ratchet body and the handle portion. The drive assembly may include a motor unit and a drive shaft connected to the motor unit. The drive shaft includes a cam disposed on the end of the driveshaft.

The method further includes the step of connecting the drive member to the fastener. Once the drive member is connected to the fastener, a user may actuate the drive assembly to cause the motor unit to rotate the drive shaft such that the cam engages the cam follower surface to rotate the drive member, thereby rotating the fastener. The user may then apply a torque to the handle portion to engage the interfacing surface with a stop surface of the cavity of the ratchet had to rotate the drive member, thereby torqueing and tightening the fastener.

BRIEF DESCRIPTION OF THE DRAWINGS

The components in the figures are not necessarily to scale, emphasis instead being placed upon illustrating the principles of the embodiments of the disclosure. In the figures, like reference numerals designate corresponding parts throughout the different views.

DETAILED DESCRIPTION OF EMBODIMENTS

Figure 1A:
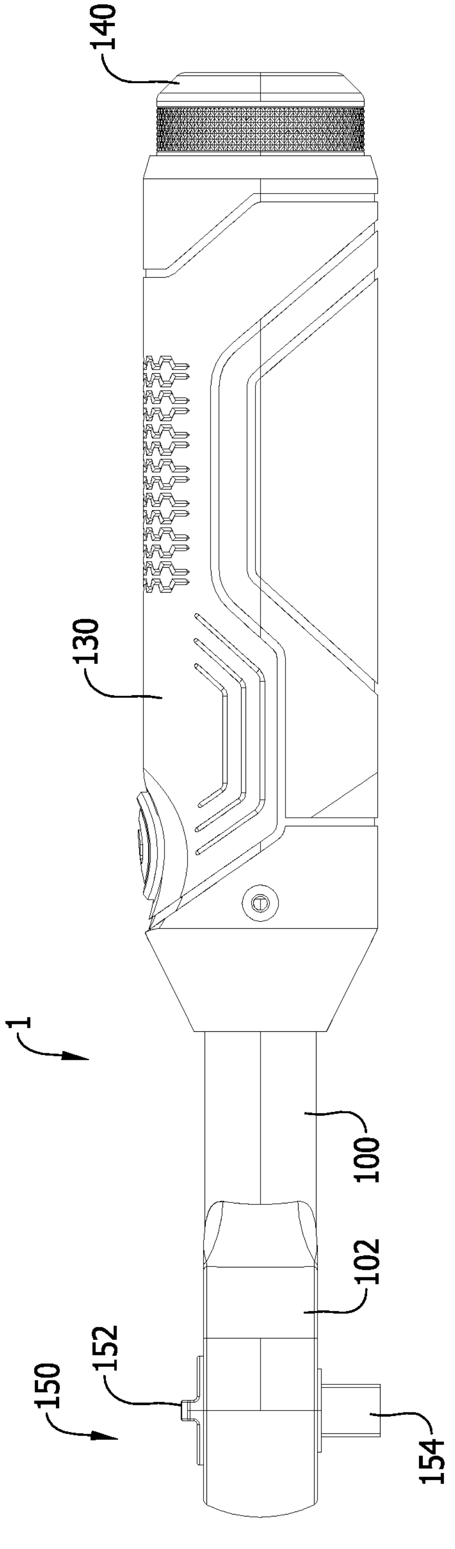
FIG. 1A is a side view of a power ratchet according to one exemplary embodiment.

Exemplary embodiments of a power ratchet will be described with reference to the accompanying drawings. FIG. 1A is a side view of a power ratchet according to one exemplary embodiment, FIG. 1B is a rear view of the power ratchet of FIG. 1A, and FIG. 1C is front view of the power ratchet of FIG. 1A.

Figure 1B:
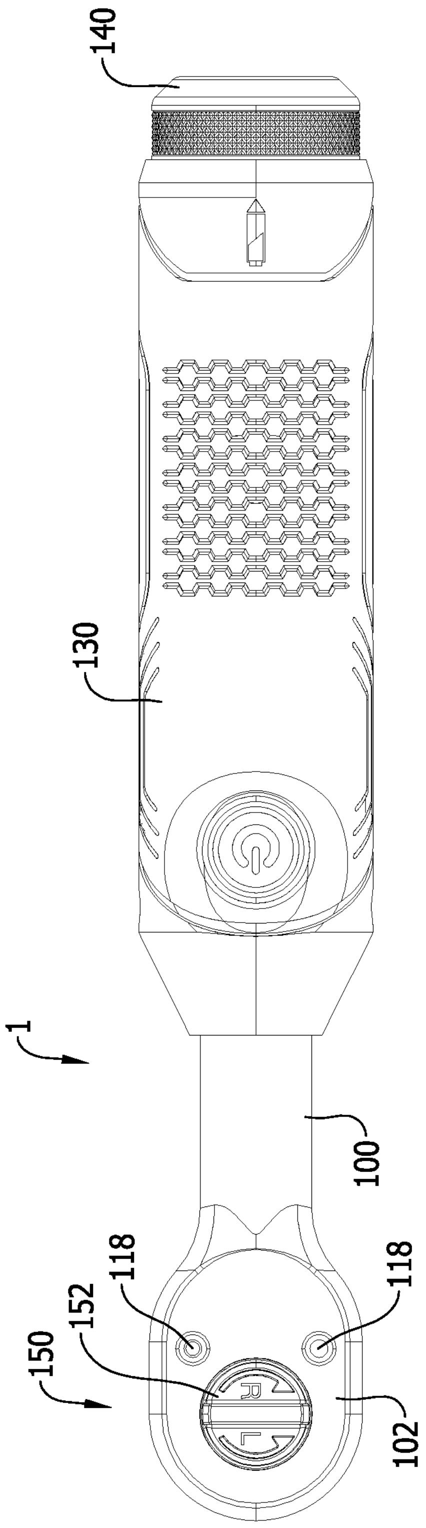
FIG. 1B is a rear view of the power ratchet of FIG. 1A.
Figure 1C:
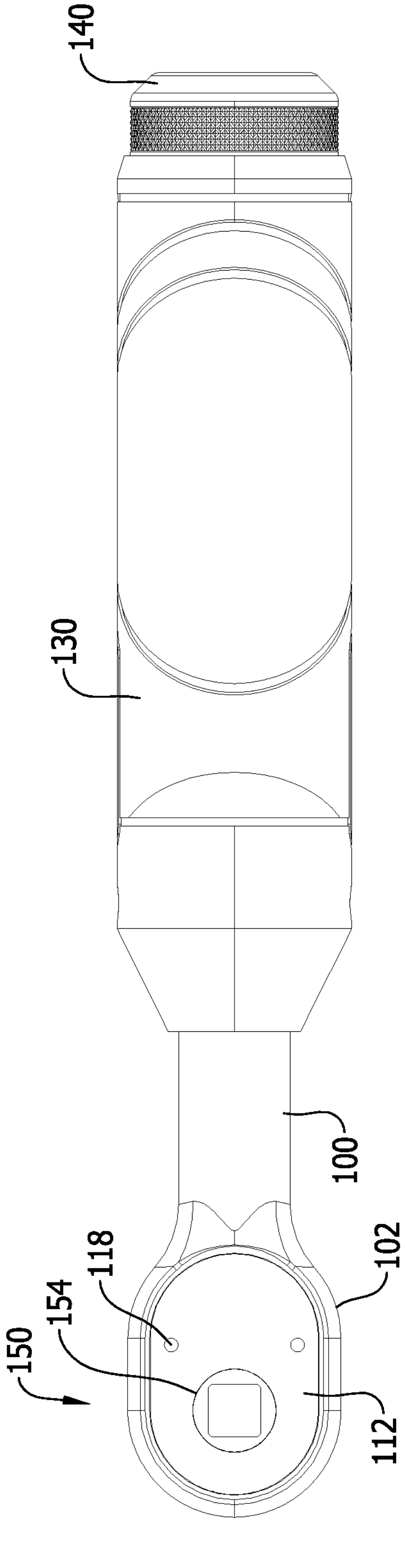
FIG. 1C is front view of the power ratchet of FIG. 1A.

As shown in FIGS. 1A-1C, a power ratchet 1 is comprised of a ratchet body 100, a handle portion 130, and an end cap 140. The ratchet body 100 may be formed from a strong, durable material capable of withstanding applied torques from a user such as steel, aluminum, alloys thereof, or other suitable materials. The ratchet body 100 includes a head 102 housing a ratchet assembly portion 150.

The ratchet assembly portion 150 includes a switch knob 152 that controls the direction of rotation that the ratchet mechanism rotates a square drive 155. The square drive 155 is configured to attach to various tools such as sockets or other adaptors as is known in the art. As shown in FIGS. 1B and 1C, fasteners 118 may be provided to secure a front plate 112 to the head 102 encasing much of the ratchet assembly portion 150.

Figure 2:
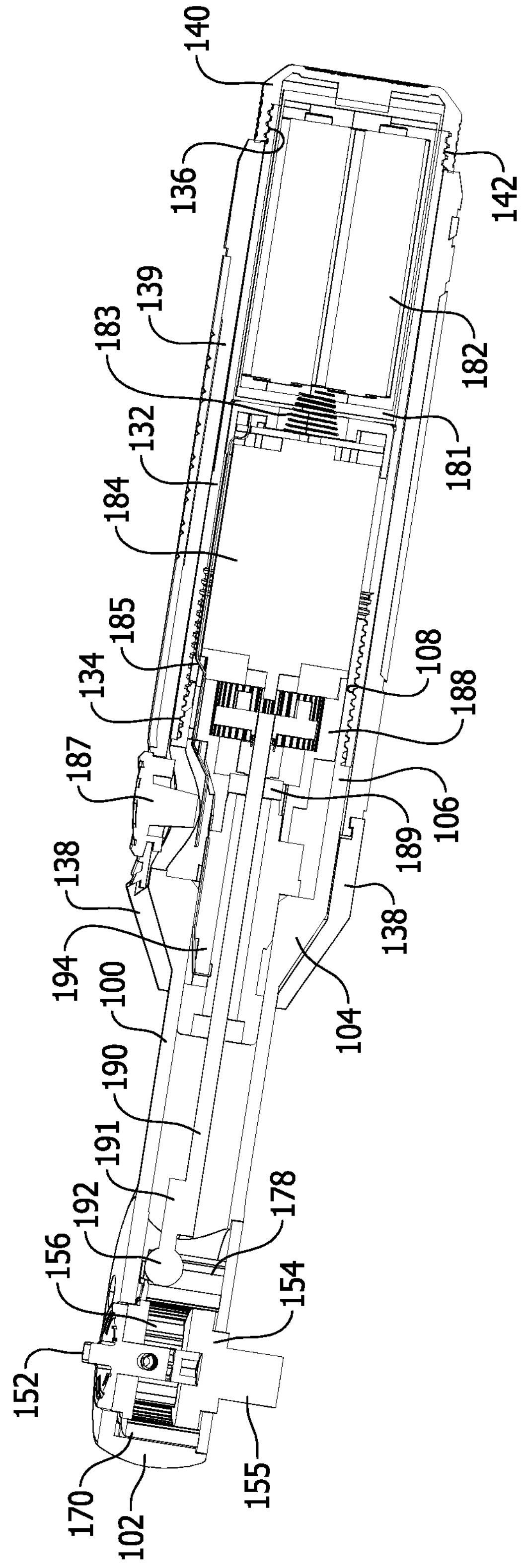
FIG. 2 is a cross section view of a power ratchet according to one exemplary embodiment.
Figure 3:
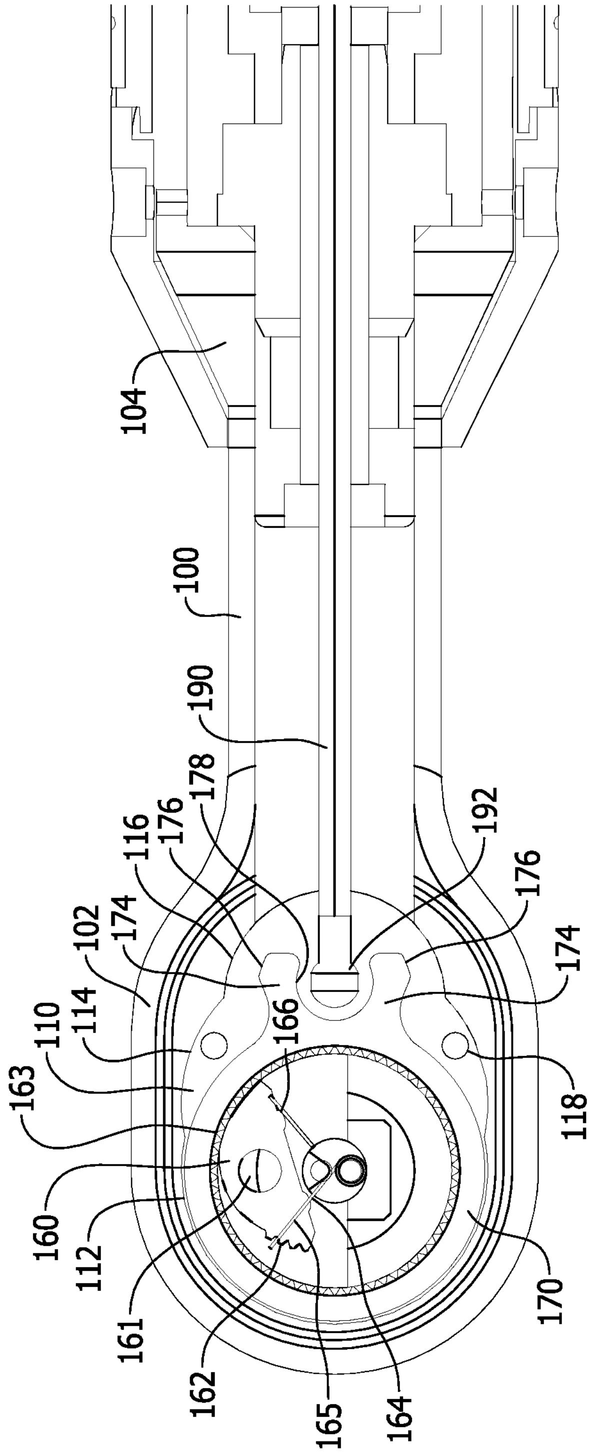
FIG. 3 is a cross section view of a head of a power ratchet according to one exemplary embodiment.
Figure 4:
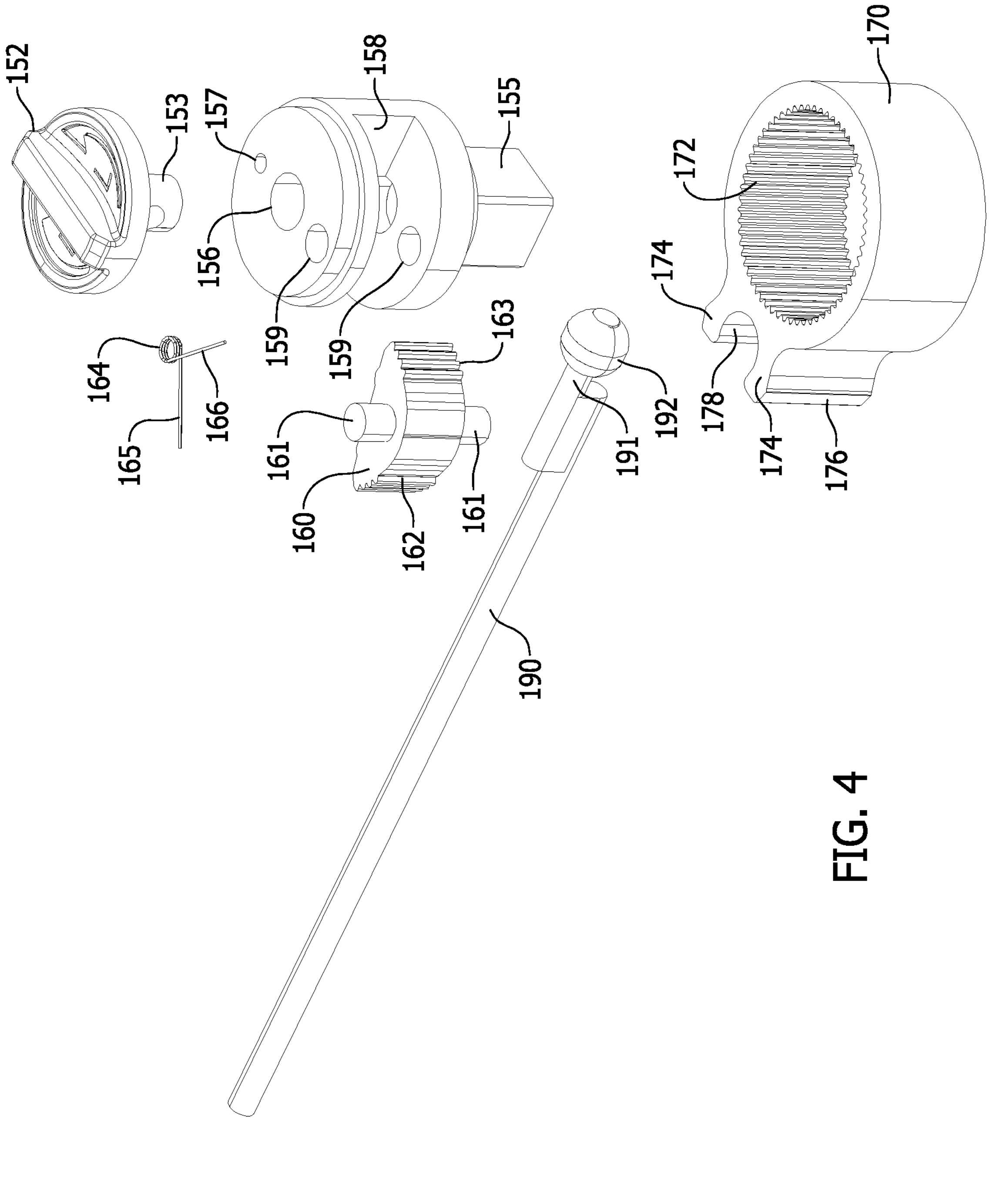
FIG. 4 is an exploded view of a ratchet mechanism for a power ratchet, according to one exemplary embodiment.

The ratchet assembly 150 will now be described in further detail with reference to FIGS. 2-4. FIG. 2 is a cross section view of a power ratchet according to one exemplary embodiment, FIG. 3 is a cross section view of a head of the power ratchet, and FIG. 4 is an exploded view of a ratchet mechanism for the power ratchet.

The ratchet mechanism 150 is comprised generally of a drive member 154 housed within a gear ring 170. The rotation of the drive member 154 is controlled by a pawl 160. The drive member 154 is formed in a cylindrical shape to fit within the gear ring 170. The square drive 155 may be formed integrally with the drive member 154 by protruding from one end thereof.

The drive member 154 comprises a slot 158 extending in from the rounded, outside surface of the drive member 154. The slot 158 houses the pawl 160. Apertures 156, 157, and 158 are provided in the drive member 154 to accommodate various connections. The aperture 156 receives a connection post 153 from the switch knob 152 to allow the switch knob 152 to interface with the pawl 160.

The pawl 160 connects to the drive member 154 via a pawl shaft 161 that extends above and below the pawl 160 and fits within the aperture 159. The pawl 160 is thus rotatable about an axis defined by the pawl shaft 161. The pawl 160 further includes a first set of teeth 162 disposed on a first side of the pawl 160 and a second set of teeth 163 disposed on the second side of the pawl 160.

The pawl 160 is rotated via a pawl spring 164. The pawl spring 164 includes a first arm 165 interfacing with the first side of the pawl 160 and a second arm 166 interfacing with the second side of the pawl 160. The pawl spring 164 is connected to the connection post 153 of the switch knob 152. Thus, when the switch knob 152 is actuated in a first direction, the first arm 165 pushes the first teeth 162 of the pawl into engagement with inner teeth 172 of the ring gear 170, and when the switch knob 152 is actuated in a second direction, the second arm 166 pushes the second teeth 163 into engagement with the inner teeth 172 of the ring ear 170.

The first and second teeth 162, 163 are sloped such that the selective engagement of the first and second teeth 162, 163 controls the rotation and torque which the power ratchet 1 may apply to a tool such as a fastener. That is, the first teeth 162 are sloped to slip over the inner teeth 172 of the ring gear 170 in a first direction and catch in a second direction, while the second teeth 163 are sloped to slip over the inner teeth 172 in the second direction and catch in the first direction.

The ratchet mechanism 150 is housed in a cavity 110 of the head 102 of the ratchet body 100. In this embodiment, the ring gear 170 is configured to fit within an inner surface 112 of the cavity 110. The ring gear 170 is rotatable relative to the surface 112. The inner surface 112 flares outward as shown as surface 114. This accommodates space for the fasteners 118 and for flanges 174. The flanges 174 extend from the ring gear 170. The flanges each include outer interfacing surfaces 176. The interfacing surfaces 176 are configured to interface with stop surfaces 116 that extend from the flared surfaces 114. Because the ring gear 170 is rotatable relative to the head 102 of the ratchet body 100, one of the interface surfaces 176 comes into contact with a corresponding stop surface 116 when a torque is applied to the handle 130 of the power ratchet 1. When the interface surface 176 engages with the stop surface 116, the torque may be transferred via the interface between the inner teeth 172 and either the first or second teeth 162, 163 of the pawl 160 to the drive member 154.

Figure 5:
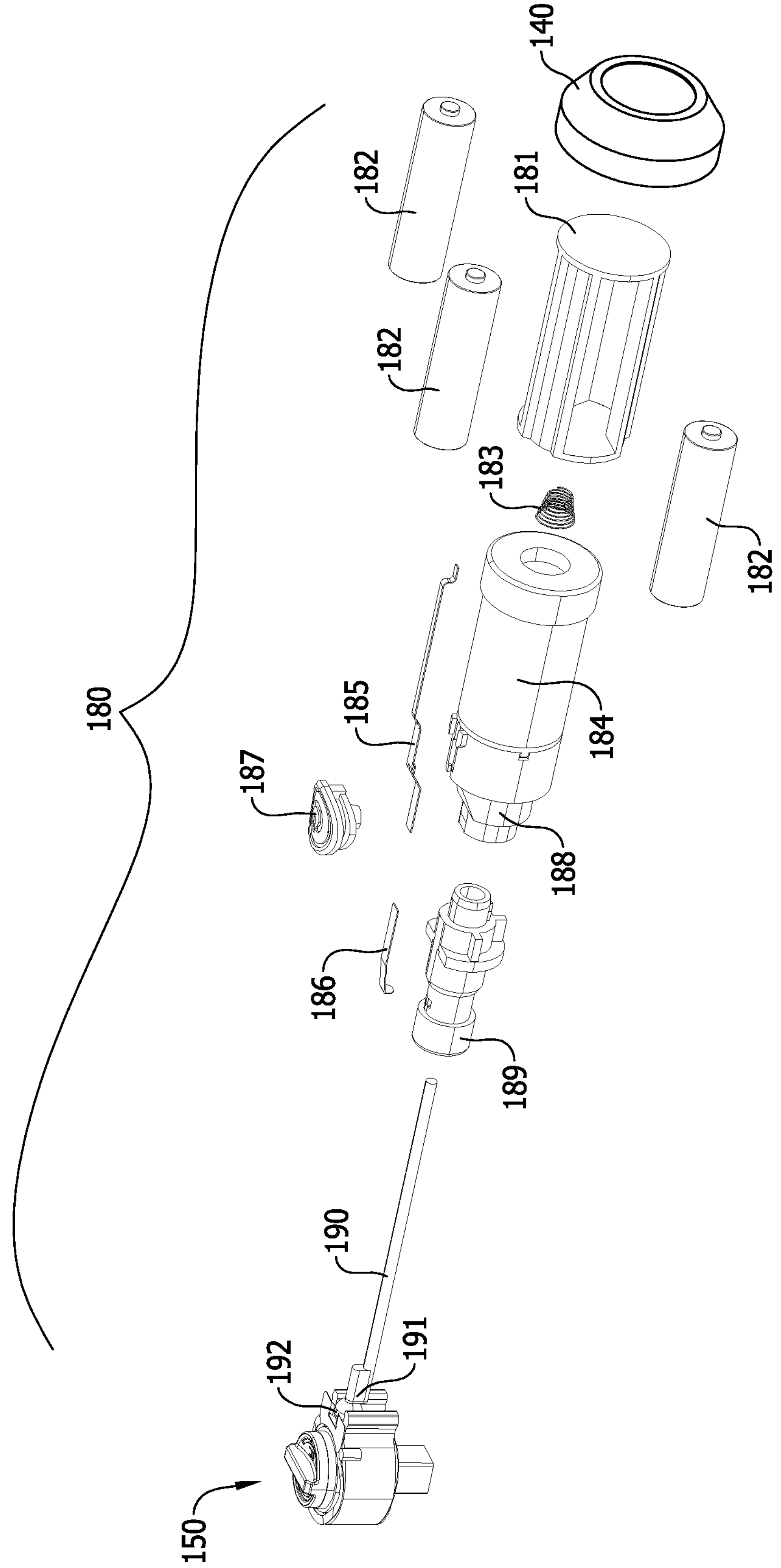
FIG. 5 is an exploded view of a drive assembly for a power ratchet, according to one exemplary embodiment.

When a torque is not being applied to the handle 130, and especially when a nut or other fastener is too loose to provide sufficient resistance for the teeth 162 or 163 to slide over of the inner teeth 172 of the ring gear, a drive assembly 180 may be utilized to rotate the drive member 154 without the need for the user to apply a torque by hand to the handle 130. The drive assembly 180 will be discussed with reference to FIGS. 2 and 5.

The drive assembly 180 comprises a battery holder 181 that houses one or more batteries 182. The batteries 182 provide power to the drive assembly 180. In other embodiments, the drive assembly 180 might include a connector to connect to external power supply. The battery holder 181 is electrically connected to a motor unit 184 via electrical wiring 183.

The motor unit 184 is configured to convert the electrical power provided by the batteries 182 to mechanical energy, specifically to rotate a shaft 190. The motor unit 184 may be any suitable electric motor such as a brushless DC electric motor, for example. The motor unit 184 may be connected to the shaft 190 via a gear box 188. The gearbox 188 may set a desired gear ratio between the output of the motor unit 184 and the rotation of the shaft 190.

The shaft 190 is supported at a first end via a bearing assembly 189 and a sleeve 194. The sleeve 194 corresponds to an inner diameter of the ratchet body 102. A second end of the shaft 190 includes a reinforced portion 191 that extends to one side of the shaft 190. At the end of the shaft 190 and reinforced portion 191, a spherical cam 192 is provided. Notably, the spherical cam 192 is offset from the axis of rotation of the shaft 190.

The spherical cam 192 is configured to interface with inner cam follower surfaces 178 of the flanges 174 of the ring gear 170 (see FIG. 3). Accordingly, when the shaft 190 is rotated by the motor unit 184, the offset spherical cam acts against the cam follower surfaces 178 to create oscillating movement of the ring gear 170. The oscillation of the ring gear causes the inner teeth 172 of the ring gear 170 to repeatedly slide over and catch the first teeth 162 or second teeth 163 of the pawl 160 (depending on the selection chosen by the switch knob 152), thereby rotating the drive member 154.

The drive assembly 180 is activated by way of a push button 187 disposed on the handle 130 of the power ratchet 1. The push button 187 causes circuitry 185 to be connected so that electricity from the battery 182 powers the motor unit 184. When the bush button 187 is released, the circuitry 185 is disconnected, and the motor unit 184 is shut off.

The drive assembly 184 is housed in the ratchet body 100 and handle portion 130. As shown in FIG. 2, the ratchet body 100 includes a shoulder portion 104. The shoulder 104 terminates at a threaded portion 108. The threaded portion 108 meets a steel tube 132 forming the main structure of the handle portion 130. The steel tube 130 comprises a first threaded end 134 that interfaces with the threaded portion 108 of the ratchet body 100 and a second threaded end 136 that interfaces with threads 142 of the end cap 140. The ratchet body 100 steel tube 132 and end cap 140 thus house all the internal elements and provide the rigid structure of the power ratchet 1.

The handle portion 130 further comprises a resilient cover to increase the ergonomics of the power ratchet 1. In this embodiment, a first resilient sleeve 138 is configured to cover the shoulder 104 of the ratchet body. A second resilient sleeve 139 connects to the first resilient sleeve 138 to cover the steel tube 132. The first and send resilient sleeves 138, 137 may also be formed of a single component, and may further include various colors and patterns on an exterior thereof. The first and second resilient sleeves 137, 138 terminate prior to the end cap 140. The exposed endcap 140 allows the user access to the battery holder 181 to replace the batteries 182 when necessary.

The power ratchet 1 described above has the advantage of operating as a convention ratchet while providing the ability to quickly drive a loose bolt or fastener via the powered drive assembly 180. For example, when a fastener is being tightened, the user may attach the drive member 154 to the fastener via the square drive 155 and actuate the push button 187. This powers the motor 184 to cause the spherical cam 192 at the end of the drive shaft 190 to induce an oscillating motion to the ring gear 170. The oscillation of the ring gear 170 causes the pawl 160 to ratchet the ring gear 170 in the direction set by the switch knob 152 until the fastener reaches a point where there is significant resistance. This point, the user may release the push button 187 and, using the leverage of the handle 130, apply a torque to the drive member 154 via the interfacing surfaces 176 of the ring gear 170 and the stop surfaces 116 of the ratchet body 100.

Similarly, when a fastener is being loosened, the user may attach the drive member 154 to the fastener via the square drive 155 and leverage the handle portion 130 apply a torque to the drive member 154 via the interfacing surfaces 176 of the ring gear 170 and the stop surface 116 of the ratchet body 100. When the fastener is loosened to the point where resistance is significantly released, the user may actuate the push button 187. This powers the motor 184 to cause the spherical cam 192 at the end of the drive shaft 190 to induce an oscillating motion to the ring gear 170. The oscillation of the ring gear 170 causes the pawl 170 to ratchet the ring gear 170 in the direction set by the switch knob 152 until the fastener can be retrieved by the user.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A power ratchet comprising:

a ratchet body having a ratchet head disposed at a first end and a shoulder portion disposed at a second end;

a handle portion comprising a tube connected to the shoulder portion of the ratchet body;

an end cap connected to the tube opposite the shoulder portion;

a ratchet assembly disposed within a cavity of the ratchet head, the ratchet assembly comprising a drive member, a rotatable pawl connected to and disposed at least partially within the drive member, a switch knob attached to and configured to rotate the rotatable pawl, and a ring gear surrounding the drive member, the ring gear being rotatable within the cavity of the ratchet head, and the ring gear comprising inner teeth that interface with the pawl and two flanges that each comprise an outer interfacing surface and an inner cam follower surface; and a drive assembly disposed within the ratchet body and the handle portion, the drive assembly comprising a motor unit and a drive shaft connected to the motor unit, the drive shaft comprising a reinforced end and a spherical cam disposed on the reinforced end of the driveshaft, the drive shaft defining a first axis, and the spherical cam being offset from the first axis;

wherein the spherical cam interfaces with the inner cam follower surface of each flange to oscillate the ring gear when the motor unit rotates the drive shaft, the oscillation rotating the drive member of the ratchet assembly via the pawl and the inner teeth of the ring gear, and wherein the outer interfacing surface of one of the two flanges interfaces with a stop surface formed in the cavity of the ratchet head to transfer a torque applied to the handle portion to the drive member of the ratchet assembly.

2. The power ratchet of claim 1, further comprising a power source connected to the motor unit.

3. The power ratchet of claim 2, wherein the power source is a battery holder configured to house at least one battery.

4. The power ratchet of claim 3, wherein the end cap provides access to the battery holder.

5. The power ratchet of claim 1, wherein the motor unit connects to the drive shaft via a gear box.

6. The power ratchet of claim 1, wherein the drive shaft is supported by one or more bearings.

7. The power ratchet of claim 1, further comprising a resilient cover disposed over the handle portion.

8. A power ratchet comprising:

a ratchet body having a ratchet head disposed at a first end thereof;

a handle portion connected to the second end of the ratchet body;

a ratchet assembly disposed within a cavity of the ratchet head, the ratchet assembly comprising a drive member, a pawl connected to the drive member, and a ring gear surrounding the drive member, the ring gear being rotatable within the cavity of the ratchet head, and the ring gear comprising inner teeth that interface with the pawl and at least one flange comprising an interfacing surface and a cam follower surface; and a drive assembly disposed within the ratchet body and the handle portion, the drive assembly comprising a motor unit and a drive shaft connected to the motor unit, the drive shaft comprising a cam disposed on the end of the driveshaft;

wherein the cam interfaces with the cam follower surface of the flange of the ring gear when the motor unit rotates the drive shaft to rotate the drive member via the pawl and the inner teeth, and wherein the interfacing surface of the flange interfaces with a stop surface formed in the cavity of the ratchet head to transfer a torque applied to the handle portion to the drive member of the ratchet assembly.

9. The power ratchet of claim 8, wherein the at least on flange comprises two flanges, and the cam of the driveshaft interfaces with the two flanges to oscillate the ring gear.

10. The power ratchet of claim 8, wherein the pawl is rotatable and comprises a first set of teeth on a first side and a second set of teeth on a second side, the first set of teeth configured to interface with the inner teeth of the ring gear to catch in a first rotational direction and slip over the inner teeth of the ring gear in a second rotational direction, and the second set of teeth configured to interface with the inner teeth of the ring gear to catch in the second rotational direction and slip over the inner teeth of the ring gear in the first rotational direction;

the ratchet assembly comprises a switch knob connected to the pawl to selectively rotate either the first set of teeth or the second set of teeth into engagement with the inner teeth of the ring gear; and the drive assembly rotates the drive member of the ratchet assembly in the first or second rotational direction based on the engagement of the first or second set of teeth with the inner teeth of the ring gear.

11. The power ratchet of claim 8, further comprising a power source connected to the motor unit.

12. The power ratchet of claim 11, wherein the power source is a battery holder configured to house at least one battery.

13. The power ratchet of claim 12, wherein the end cap provides access to the battery holder.

14. The power ratchet of claim 8, wherein the motor unit connects to the drive shaft via a gear box.

15. The power ratchet of claim 8, wherein the drive shaft is supported by one or more bearings.

16. The power ratchet of claim 8, further comprising a resilient cover disposed over the handle portion.

17. A method of tightening a fastener, the method comprising:

providing a power ratchet comprising:

a ratchet body having a ratchet head disposed at a first end thereof;

a handle portion connected to the second end of the ratchet body;

a ratchet assembly disposed within a cavity of the ratchet head, the ratchet assembly comprising a drive member, a pawl connected to the drive member, and a ring gear surrounding the drive member, the ring gear being rotatable within the cavity of the ratchet head, and the ring gear comprising inner teeth that interface with the pawl and at least one flange comprising an interfacing surface and a cam follower surface; and a drive assembly disposed within the ratchet body and the handle portion, the drive assembly comprising a motor unit and a drive shaft connected to the motor unit, the drive shaft comprising a cam disposed on the end of the driveshaft;

connecting the drive member to the fastener;

actuating the drive assembly to cause the motor unit to rotate the drive shaft such that the cam engages the cam follower surface to rotate the drive member, thereby rotating the fastener; and applying a torque to the handle portion to engage the interfacing surface with a stop surface of the cavity of the ratchet had to rotate the drive member, thereby torqueing and tightening the fastener.

* * * * *